US010541827B2

(12) United States Patent
Bastide et al.

(10) Patent No.: US 10,541,827 B2
(45) Date of Patent: *Jan. 21, 2020

(54) MESSAGE MANAGEMENT

(71) Applicant: International Business Machines Corporation, Armonk, NY (US)

(72) Inventors: Paul R. Bastide, Boxford, MA (US); Jonathan Dunne, Dungarvan (IE); Liam Harpur, Dublin (IE); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/449,328

(22) Filed: Mar. 3, 2017

(65) Prior Publication Data

US 2018/0254913 A1  Sep. 6, 2018

(51) Int. Cl.
*H04L 12/18* (2006.01)
*G06F 17/27* (2006.01)
*H04L 12/58* (2006.01)

(52) U.S. Cl.
CPC ...... *H04L 12/1831* (2013.01); *G06F 17/2765* (2013.01); *G06F 17/2785* (2013.01); *H04L 12/1827* (2013.01); *H04L 51/12* (2013.01); *H04L 51/04* (2013.01); *H04L 51/32* (2013.01)

(58) Field of Classification Search
CPC ...... H04L 12/1831; H04L 51/12; H04L 51/04
USPC ........................................................ 709/206
See application file for complete search history.

(56) References Cited

U.S. PATENT DOCUMENTS 8,892,136 B2  11/2014  Bobotek
2009/0299925 A1* 12/2009  Ramaswamy ........ G06F 21/316
                                                                  706/12
2009/0327054 A1  12/2009  Yao et al.
(Continued)

OTHER PUBLICATIONS

"Automatic review assignments", Simple Machines, https://www.conftool.net/ctforum/index.php?topic=39.0, Conference Management Tool, retrieved from the internet Nov. 15, 2016, 1 page.
(Continued)

*Primary Examiner* — Wing F Chan
*Assistant Examiner* — Leon Y Tseng
(74) *Attorney, Agent, or Firm* — Stephen R. Tkacs; Stephen J. Walder, Jr.; L. Jeffrey Kelly

(57) ABSTRACT

A mechanism is provided in a data processing system to implement an offensive action management system for acting on offensive messages in a communication platform. A message monitoring component monitors messages posted to the communication platform. Responsive to the message monitoring component detecting a flagged message posted by an offending user to a conversation, a review group selection component identifies a review group of users to determine a downstream action for the flagged message. A poll generation/analysis component presents a poll to the review group of users. The poll presents a set of downstream actions for the flagged message. The poll generation/analysis component determines a downstream action based on results of the poll. A downstream action component automatically performs the determined downstream action on the communication platform.

20 Claims, 3 Drawing Sheets

(56) References Cited

U.S. PATENT DOCUMENTS

| | | | |
|---|---|---|---|
| 2012/0030301 A1* | 2/2012 | Herold | G06Q 10/10 |
| | | | 709/206 |
| 2015/0195295 A1 | 7/2015 | Sandler et al. | |
| 2015/0309987 A1 | 10/2015 | Epstein et al. | |
| 2015/0312199 A1 | 10/2015 | Bastide et al. | |
| 2015/0341305 A1 | 11/2015 | Bastide et al. | |
| 2015/0350117 A1 | 12/2015 | Bastide et al. | |
| 2015/0365366 A1 | 12/2015 | Prabhu | |
| 2016/0021053 A1 | 1/2016 | Bastide et al. | |
| 2016/0048760 A1 | 2/2016 | Bastide et al. | |
| 2016/0088063 A1 | 3/2016 | Cahn et al. | |
| 2016/0166931 A1 | 6/2016 | Mescon et al. | |
| 2016/0173435 A1 | 6/2016 | Abou Mahmoud et al. | |
| 2016/0294753 A1 | 10/2016 | Centner | |
| 2017/0041263 A1* | 2/2017 | Shekel | H04L 51/12 |

OTHER PUBLICATIONS

Bennington, Emily, "What to do when an Employee Violates your Social Media Policy", Monster Worldwide, http://hiring.monster.com/hr/hr-best-practices/small-business/social-media-trends/social-media-guidelines.aspx, retrieved from the internet Nov. 14, 2016, 4 pages.

Long, Cheng et al., "On Good and Fair Paper-Reviewer Assignment", IEEE, 2013 IEEE 13th International Conference on Data Mining, Dallas, Texas, Dec. 7-10, 2013, pp. 1145-1150.

List of IBM Patents or Patent Applications Treated as Related, Nov. 21, 2017, 2 pages.

Dewan, Prateek et al., "Towards Automatic Real Time Identification of malicious Posts on Facebook", IEEE, Jul. 21-23, 2015, 8 pages.

* cited by examiner

MESSAGE MANAGEMENT

BACKGROUND

The present application relates generally to an improved data processing apparatus and method and more specifically to mechanisms for online social media offensive action management.

Online chat may refer to any kind of communication over the Internet that offers a real-time transmission of text messages from sender to receiver. Chat messages are generally short in order to enable other participants to respond quickly. Thereby, a feeling similar to a spoken conversation is created, which distinguishes chatting from other text-based online communication forms such as Internet forums and email. Online chat may address point-to-point communications as well as multicast communications from one sender to many receivers and voice and video chat, or may be a feature of a web conferencing service.

Online chat in a less stringent definition may be primarily any direct text-based or video-based (webcams), one-on-one chat or one-to-many group chat, using tools such as instant messengers, Internet Relay Chat (IRC), talkers and possibly multi-user dungeons (MUDs). The expression online chat comes from the word chat which refers to informal conversation. Online chat includes web-based applications that allow communication—often directly addressed, but anonymous between users in a multi-user environment. Web conferencing is a more specific online service that is often sold as a service and hosted on a web server controlled by the vendor.

Social media are computer-mediated technologies that allow the creating and sharing of information, ideas, career interests, or other forms of expression via virtual communities and networks. The variety of stand-alone and built-in social media services currently available introduces challenges of definition. However, there are some common features. User-generated content, such as text posts or comments, digital photos or videos, and data generated through all online interactions, are the lifeblood of social media. Users create service-specific profiles for the website or app that are designed and maintained by the social media organization. Social media facilitate the development of online social networks by connecting a user's profile with those of other individuals and/or groups.

Social media use web-based technologies, desktop computers and mobile technologies (e.g., smartphones, tablet computers, and wearable devices) to create highly interactive platforms through which individuals, communities and organizations can share, co-create, discuss, and modify user-generated content or pre-made content posted online. They introduce substantial and pervasive changes to communication between businesses, organizations, communities and individuals. Social media changes the way individuals and large organizations communicate.

Observers have noted a range of positive and negative impacts from social media use. Social media can help to improve an individual's sense of connectedness with real and/or online communities, and social media can be an effective communications or marketing tool for corporations, entrepreneurs, nonprofit organizations, advocacy groups, political parties, and governments. At the same time, concerns have been raised about possible links between heavy social media use and depression, and even the issues of cyberbullying, online harassment and "trolling."

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to cause the at least one processor to implement an offensive action management system for acting on offensive messages in a communication platform. The method comprises monitoring, by a message monitoring component of the offensive action management system, messages posted to the communication platform. The method further comprises, responsive to the message monitoring component detecting a flagged message posted by an offending user to a conversation, identifying, by a review group selection component of the offensive action management system, a review group of users to determine a downstream action for the flagged message. The method further comprises presenting, by a poll generation/analysis component of the offensive action management system, a poll to the review group of users, wherein the poll presents a set of downstream actions for the flagged message. The method further comprises determining, by the poll generation/analysis component, a downstream action based on results of the poll. The method further comprises automatically performing, by a downstream action component of the offensive action management system, the determined downstream action on the communication platform.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
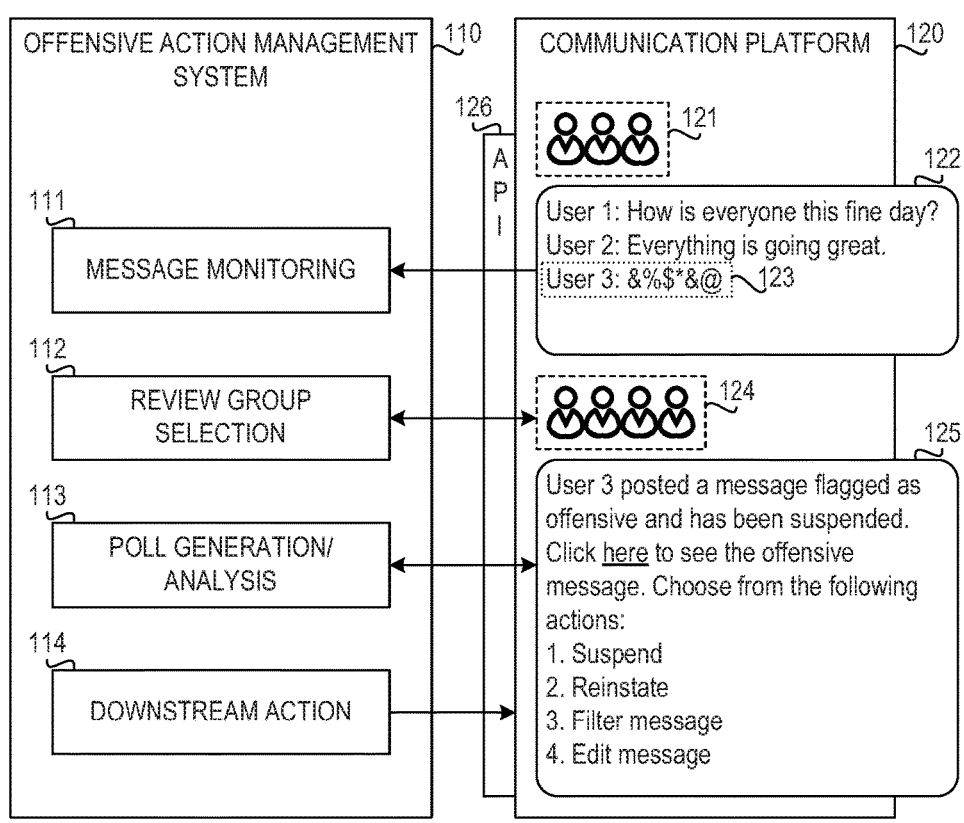
FIG. 1 is a block diagram illustrating an online social network with offensive action management in accordance with an illustrative embodiment.

Mail clients, instant messaging, and online social networks are the universal mechanisms to connect people and information in logical and organized ways that enable sharing and processing of information between users. The most common mechanisms for sharing and processing information are the inbox, chat room, wall, activity stream, timeline, and profile. These mechanisms enable one to rapidly share information with others and gather information from others.

In the various forms of social media, there are many messages of mixed quality. Users may flag many messages a day as offensive or inappropriate. In response to a user flagging a message as offensive, the social media platform may force the offending user to wait before posting again while an administrator reviews the flagged message. With the enormous volume of messages, this wait may be considerable, and the administrator may not be the best person to consider the context of the message or the personal preferences of the group.

The illustrative embodiments improves action on offensive messages in online social networks by providing an offensive action management mechanism that monitors a posted message for user activity, detects a flagged message, identifies users who are not participating in the message activity to determine a review group, prompts the review group to analyze the offense and vote on a downstream action, and automatically takes a downstream action based on the result of the vote. The mechanism of the illustrative embodiments may require a quorum of responses. The mechanism may act on the message by locking, unlocking, deleting, or changing filters for the message for a group of people. The mechanism may act on the message by a consensus edit of the message by a trusted group. The mechanism may isolate different renditions of the offensive message to the social networks that found it offensive.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "component," if used herein with regard to describing embodiments and features of the invention, is not intended to be limiting of any particular implementation for accomplishing and/or performing the actions, steps, processes, etc., attributable to and/or performed by the engine. A component may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple components, incorporated into and/or combined with the functionality of another component of the same or different type, or distributed across one or more components of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

FIG. 1 is a block diagram illustrating an online social network with offensive action management in accordance with an illustrative embodiment. The online social network 100 includes a communication platform 120 in which a group of participating users 121 engage in a conversation 122. Communication platform may be, for example, Internet relay chat service, email server, group text service, instant messaging application, voice over Internet Protocol (VOIP) service, video chat platform, social network, message board service, review platform, comment platform, online collaboration service, wiki Web site, multi-user dungeon (MUD) or massively multiplayer online role playing game (MMORPG), or any other known or yet to be developed communication platform. Conversation 122 may be a group chat, email exchange, group text, wall, timeline, or the like, provided by communication platform 122.

In the depicted example, user 3 enters message 123, which may be considered offensive or inappropriate by other users in the group of participating users 121. In current systems, one of participating users 121 may flag message 123 as offensive or inappropriate. Communication platform 120 may then remove message 123 from view in conversation 122 and optionally suspend access to user 3 until message 123 can be reviewed by an administrator.

In accordance with an illustrative embodiment, offensive action management system 110 communicates with communication platform 120 and includes message monitoring component 111, review group selection component 112, poll generation/analysis component 113, and downstream action component 114. Message monitoring component 111 monitors conversation 122 and detects the offensive or inappropriate message 123. In one embodiment, monitoring component 111 may detect when message 123 is flagged by a user within the group of participating users 121.

In another embodiment, message monitoring component 111 may perform natural language processing, such as pattern matching to identify known offensive words, phrases, known structures of unsolicited messages that violate end user licensing agreements or service policies. For example, message monitoring component 111 may scan messages for known swear or curse words, racial slurs, or other sensitive subject matter. Alternatively, or in addition, message monitoring component 111 may scan messages for uniform resource locators (URLs) or other indicators of unsolicited messages that could include commercial scamware, viruses, or links to paid Web sites for the purpose of click fraud.

In one embodiment, message monitoring component may detect when the topic of a message is outside the subject matter of conversation 122. For example, a political post may cause unnecessary turmoil in a hobby group, or a sports-related message may derail a work project. Thus, message monitoring component 111 may detect such a message 123 and flag it for review.

Message monitoring component 111 may process a message when it is entered but before display, after display, or after being flagged. For instance, message monitoring component 111 may be triggered by a push event, where content (each event) is published to a recipient, and the recipient acts on the message. Gnip or Compliance application programming interfaces (APIs) are common methods for push events. Alternatively, message monitoring component 111 may be triggered by a pull event, where content is continuously monitored for an updated entry added to the message list. In another embodiment, message monitoring component 111 may be triggered by a user interface (UI) event. When a new message is received, message monitoring component 111 detects the presentation of a specific message view and is triggered when the user specifically calls for an action via a menu.

Once the act of receiving a message is determined, message monitoring component 111 may extract the content of the message (e.g., topic, grammar, @mention, #hashtag, etc.). Message monitoring component 111 may only activate for certain types of messages (e.g., high importance, confidential, containing a specific keyword, or based on a paid/promoted offering or subject, such as a brand promotion). Thus, message monitoring component 111 may activate based on analyzed text.

Once a message is flagged or detected, message monitoring component 111 may check the total number of flags and factors in the risk of the language/behavior to generate a risk score. Message monitoring component 111 may use a machine learning model to generate the risk score. The machine learning model may be a linear regression model, a clustering analysis model, or the like. Thus, the message monitoring component 111 may be trained using a set of training data consisting of known offensive or inappropriate messages. Message monitoring component 111 then compares the risk score against a threshold. Consider the following example:

$$3 \text{ flags} \times 5 \text{ of } 10 \text{ for language risk} = 1.5 \text{ risk score}$$

If the minimum threshold is 1, then the message monitoring component 111 identifies the message as offensive.

In response to detecting offensive message 123, review group selection component 112 communicates with communication platform 120 to identify a group of non-participating users 124, who are not engaging in conversation 122, to serve as a review group for the offensive message 123. In one embodiment, review group selection component 112 may request communication platform 120 to randomly identify a predetermined number of all users not in group 121 to serve as an impartial review group. In another embodiment, review group selection component 112 may request a group of users not in group 121 who volunteer to be included in review groups. In yet another embodiment, review group selection component 112 may request users 124 from friends or friends-of-friends of users in group 121. Alternatively, review group selection component 112 may request users 124 from friends or friends-of-friends of the offending user and the flagging user(s). In another embodiment, review group selection component 112 may request users 124 from one or more online communities to which users 121 belong. Thus, review group selection component 112 may use one or more sets of rules to balance impartiality of users with knowledge of the context of the message. In one example embodiment, review group selection component 112 may select the one or more sets of rules from a user configurable policy (not shown).

Poll generation/analysis component 113 generates poll 125 and presents the poll to the group of non-participating users 124 through communication platform 120. Alternatively, poll generation/analysis component 113 may present the poll to the users 124 outside communication platform 120. In the depicted example, the poll 125 identifies the user, provides a link to the offending message for review, and provides a plurality of options for downstream action. The link to the offending message may show the message in context. In another embodiment, the identity of the offending user may be hidden to protect against bias.

In the depicted example, the options for downstream action include the following:

1. Suspend: suspend the user from accessing communication platform 120 for a predetermined period of time;
2. Reinstate: restore access to the user;
3. Filter message: remove the offending message 123 from conversation 122; and,
4. Edit message: perform a consensus edit of the message by a trusted group, possibly the review group of users 124.

In an alternative embodiment, poll generation/analysis component 113 may present message 123, optionally in the context of conversation 122, to the group of non-participating users 124 and prompt the users 124 to vote using existing modalities, such as like/unlike, +1, thumbs up/down, favorite or heart, star rating, helpful or unhelpful, etc.

Figure 2:
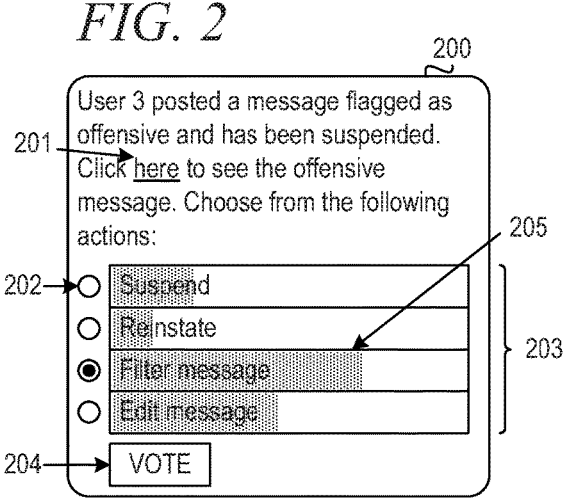
FIG. 2 depicts an example poll interface in accordance with an illustrative embodiment.

FIG. 2 depicts an example poll interface in accordance with an illustrative embodiment. Poll user interface 200 identifies that a particular user posted a message flagged as offensive or inappropriate. Poll user interface 200 provides a link 201 to view the offending message in context. Selection of link 201 triggers presentation of the message within the conversation 122, for example. Poll user interface 200 presents a plurality of options for downstream action 203, each having a corresponding radio button 202 for selection. The user selects a radio button 202 for a chosen downstream action and selects "vote" button 204.

In the depicted example, poll user interface 200 presents the downstream action options 203 with current poll results shown as a shaded bar graph 205. In an alternative embodiment, poll user interface 200 may hide the poll results 205 until the user submits a vote by selecting the "vote" button 204.

Poll generation/analysis component 113 receives a result of the poll 125 and analyzes the results to determine a downstream action. That is, poll generation/analysis component 113 records the votes across the review group of users 124. Poll generation/analysis component 113 may end voting after a predetermined time period. Poll generation/analysis component 113 may generate a score based on the voting results. For example, poll generation/analysis component 113 may generate a score as a percentage of votes received by the winning action. Poll generation/analysis component 113 may require a predetermined number of votes (i.e., a quorum) before deciding an action. Poll generation/analysis component 113 may also compare the score to a predetermined threshold before deciding on a downstream action.

Downstream action component 114 communicates with communication platform 120 to automatically take the determined downstream action based on the results of the poll/vote. Downstream action component 114 may act on message 123 by locking, unlocking, deleting, or changing the filters for the message for a group of people, such as the group of participating users 121. Downstream action component 114 may isolate different renditions of the offending message 123 to the social networks, such as communication platform 120, that found the message 123 offensive or inappropriate. Downstream action component 114 may act on the message 123 by a consensus edit of the message by a trusted group of users.

Offensive action management system 110 may communicate with communication platform 120 via application programming interface (API) 126. The API 126 may provide access to lists of users and messages posted by all or a subset of users in all or a subset of conversations. API 126 may also allow offensive action management system 110 to post polls or other messages to all or a subset of users. In one embodiment, API 126 allows offensive action management system 110 to perform compliance and enforcement actions on users and messages.

In one embodiment, offensive action management system 110 may communicate with multiple communication platforms. Tools exist for users to post a message multiple social networks. For example, a user may make a blog post that triggers a microblogging post on one social networking platform and a timeline post on another social networking platform. Offensive action management system 110 may communicate with a plurality of communication platforms to detect offensive or inappropriate messages. Offensive action management system 110 may detect when the same message appears on multiple communication platforms or social networks and generate a single poll to determine a downstream action, taking the determined action on the multiple communication platforms.

In an alternative embodiment, offensive action management system 110 may be a part of or embedded within communication platform 120.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
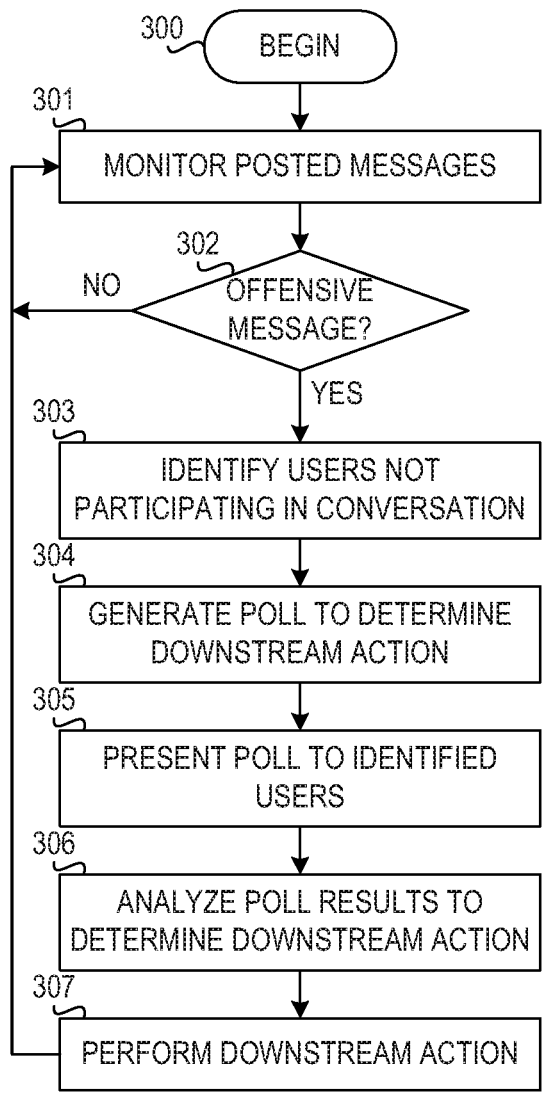
FIG. 3 is a flowchart illustrating operation of an offensive action management system in accordance with an illustrative embodiment.

FIG. 3 is a flowchart illustrating operation of an offensive action management system in accordance with an illustrative embodiment. Operation begins (block 300), and a message monitoring component of the offensive management system monitors posted messages (block 301). The message monitoring component determines whether an offensive message is detected (block 302). The message monitoring component may detect an offensive message responsive to a user flagging a message as offensive or inappropriate. Alternatively or in addition, the message monitoring component may analyze the content and syntax of message to detect known words or patterns that are likely indicators of an offensive or inappropriate message. If the message monitoring component does not detect an offensive message, then operation returns to block 301 to monitor posted messages.

If the message monitoring component detects an offensive message in block 302, then a review group selection component of the offensive action management system identifies users not participating in the conversation in which the offensive message was posted (block 303). This group of non-participating users serves as a review group to review the message to determine a downstream action.

A poll generation/analysis component of the offensive action management system generates a poll to determine a downstream action (block 304) and presents the poll to the identified users (block 305). The poll generation/analysis component analyzes the poll results to determine the downstream action (block 306). Then, a downstream action component of the offensive action management system performs the downstream action (block 307). The downstream action may be one or more of the following: locking the message, unlocking the message, suspending the offending user, reinstating the offending user, filtering the message from view, or performing a consensus edit of the message. Thereafter, operation returns to block 301 to monitor subsequent posted messages.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
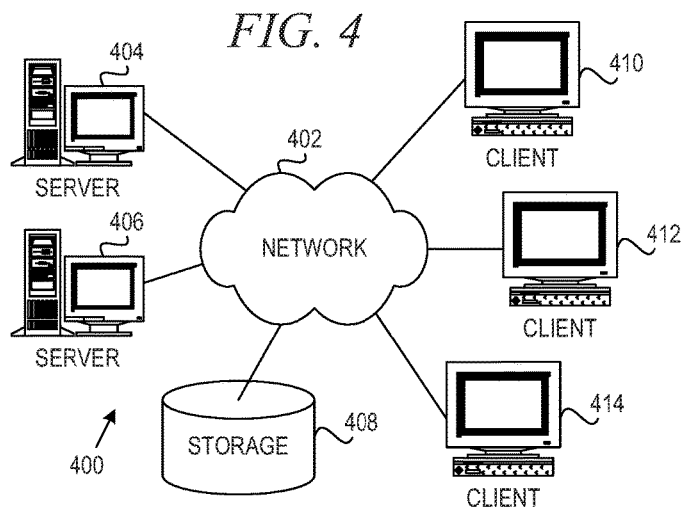
FIG. 4 is an example diagram of a distributed data processing system in which aspects of the illustrative embodiments may be implemented.
Figure 5:
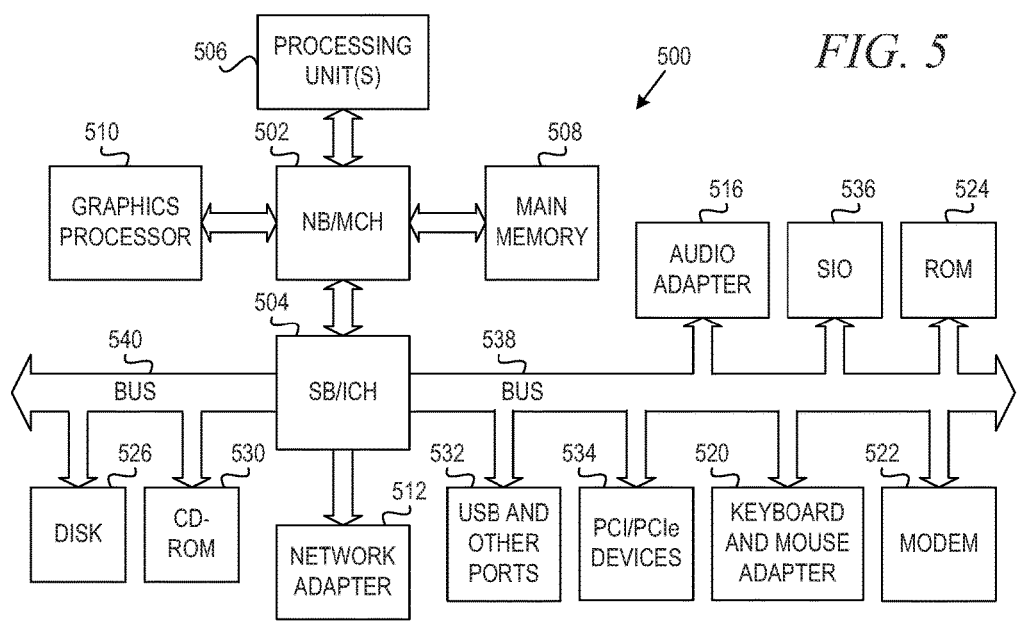
FIG. 5 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 4 and 5 are provided hereafter as example environments in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404, may be specifically configured to implement an offensive action management system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates offensive action management.

As noted above, the mechanisms of the illustrative embodiments utilize specifically configured computing devices, or data processing systems, to perform the operations for an offensive action management system. These computing devices, or data processing systems, may comprise various hardware elements which are specifically configured, either through hardware configuration, software configuration, or a combination of hardware and software configuration, to implement one or more of the systems/subsystems described herein. FIG. 5 is a block diagram of just one example data processing system in which aspects of the illustrative embodiments may be implemented. Data processing system 500 is an example of a computer, such as server 404 in FIG. 4, in which computer usable code or instructions implementing the processes and aspects of the illustrative embodiments of the present invention may be located and/or executed so as to achieve the operation, output, and external affects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System p® computer system, Power™ processor based computer system, or the like, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory

508, for executed by one or more hardware processors, such as processing unit 506, or the like. As such, the computing device shown in FIG. 5 becomes specifically configured to implement the mechanisms of the illustrative embodiments and specifically configured to perform the operations and generate the outputs described hereafter with regard to the offensive action management system.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

Thus, the illustrative embodiments provide mechanisms for offensive action management in online social networks. The mechanisms improve action on offensive messages by monitoring posted messages for user activity (e.g., read, like, comment, view), detecting when a message is flagged as offensive or inappropriate, identifying users who are not participating in the message or message activity to determine a review group, prompting the review group to analyze the offense and vote on a downstream action, and automatically taking the downstream action based on the vote. Thus, the mechanisms of the illustrative embodiments provide a crowd-sourced solution to offensive action management, thus reducing or eliminating the need for administrators to review individual messages. The mechanisms of the illustrative embodiments provide functional improvement for social media messaging and enhance the user experience with mail and social networks.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a computing device, causes the computing device to implement an offensive action management system for acting on offensive messages in a communication platform, wherein the computer readable program causes the computing device to:

monitor, by a message monitoring component of the offensive action management system, messages posted to the communication platform;

responsive to the message monitoring component detecting a flagged message posted by an offending user to a conversation, identify, by a review group selection component of the offensive action management system, a review group of users to determine a downstream action for the flagged message;

present, by a poll generation/analysis component of the offensive action management system, a poll to the review group of users, wherein the poll presents a set of downstream actions for the flagged message;

determine, by the poll generation/analysis component, a downstream action based on results of the poll; and automatically perform, by a downstream action component of the offensive action management system, the determined downstream action on the communication platform.

2. The computer program product of claim 1, wherein monitoring the messages posted to the communication platform comprises detecting the flagged message is flagged by at least one user participating in the conversation as offensive or inappropriate.

3. The computer program product of claim 1, wherein identifying the review group of users comprises identifying a plurality of users not participating in the conversation.

4. The computer program product of claim 1, wherein the set of downstream actions comprises at least one of the group consisting of: locking the flagged message, unlocking the flagged message, suspending the offending user, reinstating the offending user, filtering the flagged message, or performing a consensus edit of the flagged message.

5. The computer program product of claim 2, wherein monitoring the messages posted to the communication platform further comprises:
   generating a score for the flagged message based on a number of users that flagged the flagged message as offensive or inappropriate; and
   comparing the generated score to a predetermined threshold.

6. The computer program product of claim 1, wherein monitoring the messages posted to the communication platform comprises performing natural language processing on the messages posted to the communication platform.

7. The computer program product of claim 3, wherein identifying the review group of users further comprises identifying friends or friends-of-friends of users participating in the conversation.

8. The computer program product of claim 1, wherein determining the downstream action based on the results of the poll comprises:
   generating a score for the determined downstream action; and
   comparing the generated score to a predetermined threshold.

9. The computer program product of claim 1, wherein determining the downstream action based on the results of the poll comprises comparing a number of users participating in the poll to a predetermined threshold.

10. The computer program product of claim 1, wherein the offensive action management system communications with the communication platform via an application programming interface.

11. An apparatus comprising:
   a processor; and
   a memory coupled to the processor, wherein the memory comprises instructions which, when executed by the processor, cause the processor to an offensive action management system for acting on offensive messages in a communication platform, wherein the instructions cause the processor to:
   monitor, by a message monitoring component of the offensive action management system, messages posted to the communication platform;
   responsive to the message monitoring component detecting a flagged message posted by an offending user to a conversation, identify, by a review group selection component of the offensive action management system, a review group of users to determine a downstream action for the flagged message;
   present, by a poll generation/analysis component of the offensive action management system, a poll to the review group of users, wherein the poll presents a set of downstream actions for the flagged message;
   determine, by the poll generation/analysis component, a downstream action based on results of the poll; and
   automatically perform, by a downstream action component of the offensive action management system, the determined downstream action on the communication platform.

12. The apparatus of claim 11, wherein monitoring the messages posted to the communication platform comprises detecting the flagged message is flagged by at least one user participating in the conversation as offensive or inappropriate.

13. The apparatus of claim 12, wherein monitoring the messages posted to the communication platform further comprises:
   generating a score for the flagged message based on a number of users that flagged the flagged message as offensive or inappropriate; and
   comparing the generated score to a predetermined threshold.

14. The apparatus of claim 11, wherein monitoring the messages posted to the communication platform comprises performing natural language processing on the messages posted to the communication platform.

15. The apparatus of claim 11, wherein identifying the review group of users comprises identifying a plurality of users not participating in the conversation.

16. The apparatus of claim 15, wherein identifying the review group of users further comprises identifying friends or friends-of-friends of users participating in the conversation.

17. The apparatus of claim 11, wherein the set of downstream actions comprises at least one of the group consisting of: locking the flagged message, unlocking the flagged message, suspending the offending user, reinstating the offending user, filtering the flagged message, or performing a consensus edit of the flagged message.

18. The apparatus of claim 11, wherein determining the downstream action based on the results of the poll comprises:
   generating a score for the determined downstream action; and
   comparing the generated score to a predetermined threshold.

19. The apparatus of claim 11, wherein determining the downstream action based on the results of the poll comprises comparing a number of users participating in the poll to a predetermined threshold.

20. The apparatus of claim 11, wherein the offensive action management system communicates with the communication platform via an application programming interface.

* * * * *